United States Patent [19]
Kunig et al.

[11] Patent Number: 5,674,117
[45] Date of Patent: Oct. 7, 1997

[54] COMPRESSION BELT SEPARATION APPARATUS

[75] Inventors: Helmut Kunig, Bad Schwartau; Siegfried Räther, Segeberg, both of Germany

[73] Assignee: Nordischer Maschininbau Rud, Baader GmbH & Co KG, Lubeck, Germany

[21] Appl. No.: 301,381

[22] Filed: Sep. 7, 1994

[30] Foreign Application Priority Data

Sep. 9, 1993 [DE] Germany .................. 93 13 610 U

[51] Int. Cl.⁶ .................. B07C 9/00; B02B 7/04
[52] U.S. Cl. .................. 452/138; 15/93.1; 99/539; 209/699
[58] Field of Search .................. 452/138, 135; 15/246.5, 104.11, 93.1; 99/539

[56] References Cited

U.S. PATENT DOCUMENTS 3,734,000  5/1973  Ziener .
3,848,289  11/1974  Bachmann .................. 15/246.5
3,862,471  1/1975  Martin .................. 452/138
3,906,577  9/1975  Brucher .................. 15/104.1 R
4,428,090  1/1984  Coggin et al. .................. 15/93 C
4,637,094  1/1987  Matsubayashi .................. 452/138
4,899,890  2/1990  Ewing et al. .................. 452/138
5,031,000  7/1991  Pozniakas et al. .................. 355/297

FOREIGN PATENT DOCUMENTS 1457000  12/1976  United Kingdom .
2165200  4/1986  United Kingdom .

Primary Examiner—Willis Little
Attorney, Agent, or Firm—Fay, Sharpe, Beall, Fagan, Minnich & McKee

[57] ABSTRACT

An apparatus for separating mixed material of different flowability comprises a hollow drum driven to rotate and having a perforated outer drum surface, about a portion of which is wrapped an endless compression belt adapted to apply pressure onto the hollow drum. For stripping material which remains on the outer surface of the hollow drum after compression, a stripping blade is provided which is arranged to float essentially radially with respect to the drum.

6 Claims, 2 Drawing Sheets

COMPRESSION BELT SEPARATION APPARATUS

BACKGROUND OF THE INVENTION

1. Field of the Invention

The invention relates to an apparatus for separating mixed materials of different flowability, in particular for the purpose of processing of foodstuffs, with a hollow drum driven to rotate and having a perforated outer surface, an endless compression belt which is adapted to apply pressure onto the hollow drum from outside on being wrapped around a portion of the circumference of the same, and means for stripping the material to be compressed from the inner and outer surfaces of the hollow drum.

2. Prior Art

An apparatus of this kind is known from DE-A-20 32 774, for example, which discloses the basic construction of this type of machine. The function of these machines is such that the material to be compressed is placed between the compression belt and the perforated outer surface of the hollow drum and is there subjected to a quasi-hydraulic pressure. This pressure causes the more readily flowable components of the material mixture to flow through the perforations of the hollow drum, while the remaining components are left on the outer drum surface and are stripped away from there.

With a separator apparatus of this kind, a variety of materials may be subjected to a separating process which involves the division of components of varying flowability. This includes for example, separating fish meat from fish bones and skin; all manner of meat types from bones, tendons, rind, skin and the like and various types of fruit having skin; shells, kernels, pips, stalks etc.; butter or cheese from packaging materials, e.g. to unpack faulty packaging, and many more.

In this process, the safe removal of the separated materials is of high importance, since this operation influences considerably both the effectiveness of the process and the quality of the product. This applies both to the extraction of the useful (or desired) product from the interior of the drum and to the removal of those components of the material to be compressed which remain on the outer surface (of the drum), the technical difficulties of the latter operation being particularly extensive. This is due, amongst other things, to the elastic deformation of the system caused by the very high forces acting on the system depending on the application, which affects the trueness and correctness with which the drum runs and/or the alignment of its axis of rotation. Under these conditions, however, the correct function of the stripping means must be ensured.

To this end, the practical prior art provides a stripping blade, which is positioned with its cutting edge directed against the direction of rotation of the hollow drum and pressed against against the outer drum surface. The pressure is performed upon parallel guidance or parallel horizontal swinging, and the pressure applied is chosen to be very high so that effective stripping is ensured even when the above mentioned deformation has occurred.

Decisive disadvantages are associated with this known arrangement and method. The initial pressure setting of the stripping blades is determined by the given structural characteristics instead of by the characteristics of the product, which requires a lower pressure, so that the hollow drum and the stripping blades are worn unnecessarily.

Attempts to remove these disadvantages include the specific selection of the material combination, such that the cheaper stripping blades function as the main wearing part. However, this is not satisfactory, since the resulting worn-away material unavoidably lands in the product, which, for reasons of health, is problematic.

Further disadvantages of this concept include the high braking moment, which adversely affects the energy balance, and the requirement for relatively frequent servicing.

3. Objects of the Invention

An object of the invention is thus to provide an apparatus which alleviates the problems associated with the prior art apparatus.

It is a particular object of the present invention to reduce the costs and further disadvantages caused by wearing of essential functional components and by the maintenance thereof.

SUMMARY OF THE INVENTION

In an apparatus for separating mixed materials of different flowability, in particular for the purpose of processing of foodstuffs, with a hollow drum driven to rotate and having a perforated outer surface, an endless compression belt which is adapted to apply pressure onto the hollow drum from outside and being wrapped around a portion of the circumference of the same, and means for stripping the material to be compressed from the inner and outer surfaces of the hollow drum, this and other objects are achieved by at least the means for stripping the outer drum surface comprising a stripping blade, which is arranged to float essentially radially with respect to the drum.

The advantages achievable therewith are in particular that the pressing force of the stripping blade on the outer drum surface can be substantially reduced due to the obtainable adaptation and force distribution, whereby all the above mentioned parameters improve accordingly.

Further advantageous embodiments of the invention are defined in the dependent claims, wherein the formation of stripping blades as slidably guided in their longitudinal extension allows the easy lateral installation and/or removal of the stripping blades.

BRIEF DESCRIPTION OF THE DRAWINGS

Other objects and advantages of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
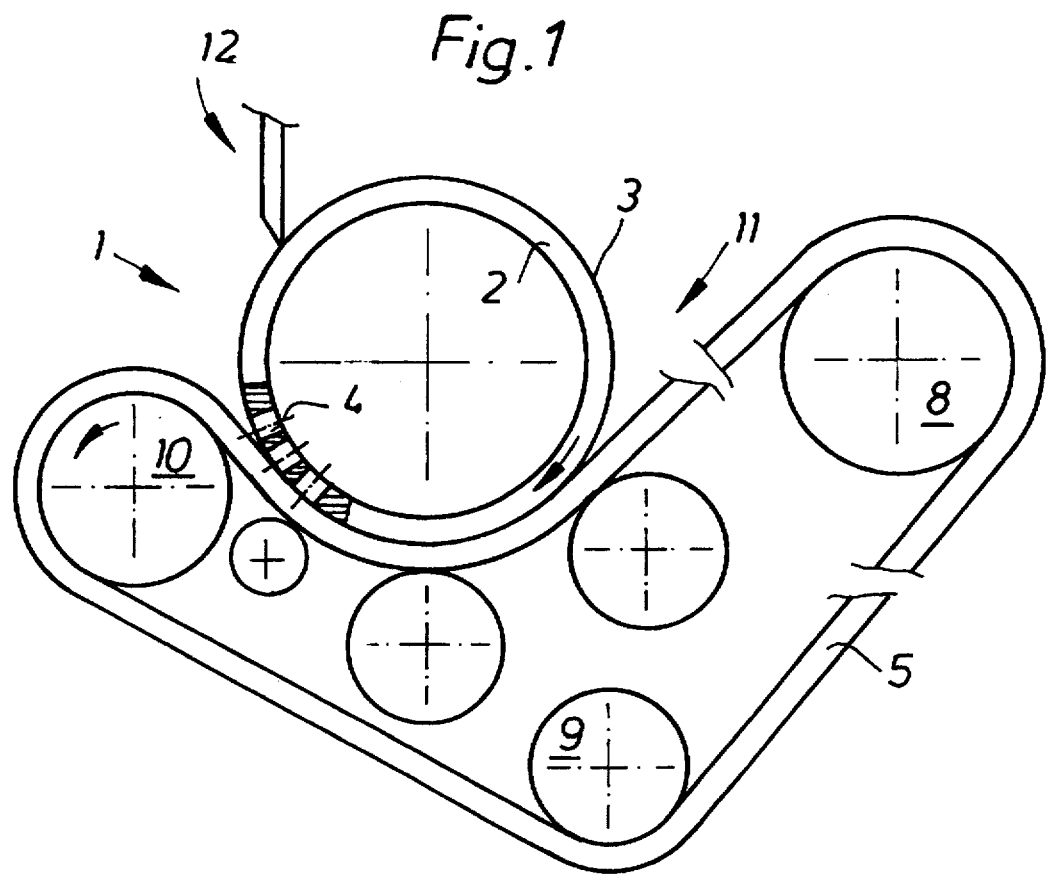
FIG. 1 shows a side view of a soft separator apparatus comprising a compression belt and hollow drum in simplified representation.
Figure 2:
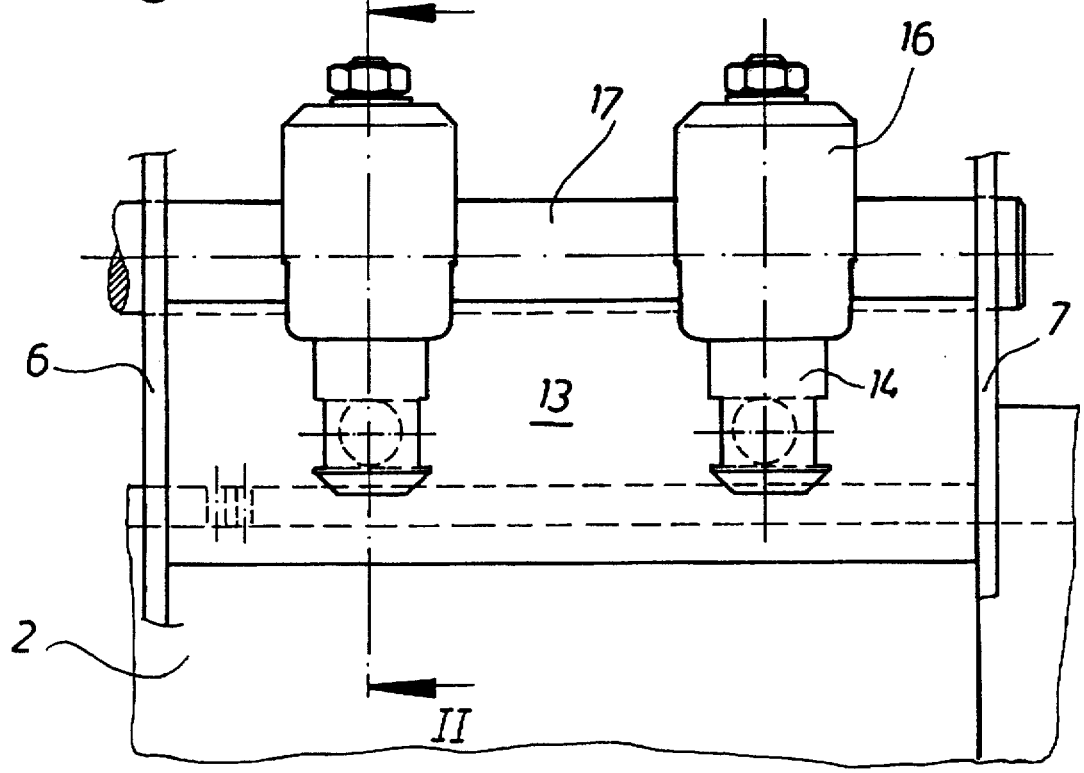
FIG. 2 shows a front view of a cut-out portion of the apparatus by way of an enlarged detail in the region of the outer stripping means.
Figure 3:
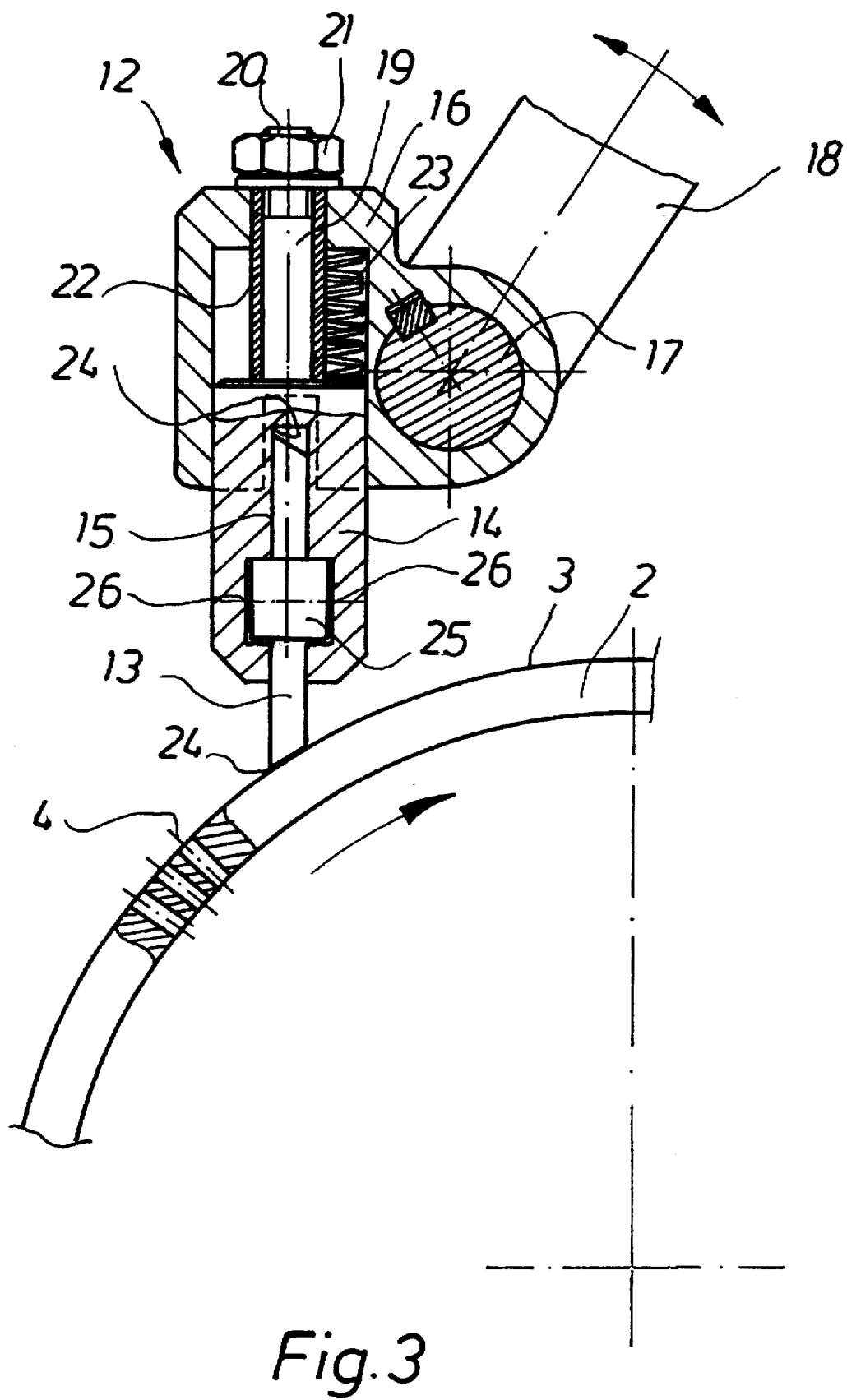
FIG. 3 shows a cross-section along the line II—II of the stripping means of FIG. 2

According to FIG. 1, a hollow drum 2, driven to rotate clockwise and comprising an outer surface 3 interspersed with perforations 4, is mounted in a non-represented frame of a soft separator apparatus 1. As shown in FIG. 1, an endless compression belt 5 is wrapped a portion of the circumference of the hollow drum 2. This compression belt 5 is made of an elastic material like rubber or polyurethane, and is guided between side walls 6 and 7, which are indicated in FIG. 2 and through which the hollow 2 drum passes. The compression belt 5 is guided over deflection rollers 9 and 10, a first one 10 of which is formed as a driven compression roller and serves to help press the compression belt 5 against the hollow drum 2. A second deflection roller 8 is formed as a tension roller and is arranged such that the compression belt 5 forms a draw-in wedge 11 with the hollow drum 2.

A stripping device 12, located in the upper region of the periphery of the hollow drum 2 cooperates functionally with the outer surface 3 of the hollow drum 2.

The stripping device 12 comprises a stripping blade 13, which is guided in central slots 15 of two supporting elements 14. These supporting elements 14 are formed as plungers and are each slidably mounted in a pot-shaped housing 16. Both housings 16 are mounted to pivot together with a pivot axle 17, which is mounted in the side walls 6 and 7 and can be pivoted by means of a pivot lever 18 which is connected to a non-shown adjusting mechanism.

The slotted end of each supporting element 14 protrudes out of the respective housing 16, while the other end is provided with a stepped shaft 19, which is mounted in the housing 16 to pass through its base wall. The shaft 19 is provided at its end with a threaded stem 20 for receiving a nut 21, which holds in place a spacer sleeve 22 located on the shaft 19. An assembly of saucer springs 23 is mounted on the sleeve 22, which springs fill the space between the spacer sleeve 22 and the cylinder wall of the housing 16 and is supported between the base wall of the housing 16 and the face formed by the step of the shaft 19 of the supporting element 14.

The stripping blade 13 is provided with a cutting edge 24 along each longitudinal side and thus both sides thereof can be used on both sides. The stripping blade 13 is provided with two cylinder bolts 25, which extend transversely through said blade 13 and protrude beyond both blade faces, the cylinder bolts 25 being engaged in pockets 26 formed in the slots 15 when the stripping blade 13 is mounted. The pockets 26 are laterally open, i.e. in the longitudinal dimension of the blade, so that the mounting or dismounting of said blade in the non-tensioned state can be performed easily, namely by means of laterally sliding the same in or out of the slot 15.

We claim:

1. An apparatus for separating mixed materials of different flowability, in particular for the purpose of processing foodstuffs, comprising a hollow drum driven to rotate about an axis and having a perforated outer wall defining an inner and outer drum surface, an endless compression belt adapted to apply pressure onto said hollow drum from outside and encompassing a portion of said outer surface of said hollow drum and means for stripping said compressed material from the outer surface of said hollow drum, wherein at least said means for stripping said outer drum surface comprises a stripping blade, which is supported by at least one supporting element to permit axial movement of said stripping blade with respect to said drum allowing removal of said blade, said supporting element engaging said blade at a discrete location and being biased towards said outer drum surface by force means acting in the plane of said blade.

2. An apparatus as claimed in claim 1, wherein said stripping blade is designed as an elongate member mounted to be slidable in a longitudinal direction.

3. An apparatus as claimed in claim 1, wherein said force means are formed as spring elements.

4. An apparatus as claimed in claim 3, wherein said stripping blade is designed as an elongate member mounted to be slidable in a longitudinal direction.

5. An apparatus as claimed in claim 1, wherein said force means are formed as at least one of hydraulically and pneumatically driven force generators.

6. An apparatus as claimed in claim 5, wherein said stripping blade is designed as an elongate member mounted to be slidable in a longitudinal direction.

* * * * *